United States Patent
Ganser et al.

(10) Patent No.: US 7,243,699 B2
(45) Date of Patent: Jul. 17, 2007

(54) WINDOW SHADE WITH CONICAL WINDING SHAFT

(75) Inventors: Konrad Wilhelm Ganser, Kisslegg (DE); Werner P. Schlecht, Vaihingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 170 days.

(21) Appl. No.: 11/159,699

(22) Filed: Jun. 23, 2005

(65) Prior Publication Data
US 2006/0000566 A1 Jan. 5, 2006

(30) Foreign Application Priority Data
Jun. 23, 2004 (DE) ...................... 10 2004 030 262

(51) Int. Cl.
*A47G 5/02* (2006.01)

(52) U.S. Cl. .................. 160/262; 160/238; 242/613

(58) Field of Classification Search ............... 160/238, 160/262, 370.21, 370.22, 370.23, 323.1, 160/324, 23.1, 24; 296/97.4, 97.7, 97.11, 296/138; 242/598.3, 599, 613, 613.1, 130.1, 242/599.2
See application file for complete search history.

(56) References Cited

U.S. PATENT DOCUMENTS

| | | | | |
|---|---|---|---|---|
| 460,208 A | * | 9/1891 | Lugrin ...................... 160/262 |
| 1,385,131 A | * | 7/1921 | Horn ......................... 160/262 |
| 2,322,934 A | * | 6/1943 | Hicks ........................ 160/387 |
| 4,114,756 A | * | 9/1978 | Dacey et al. ............... 206/389 |
| 5,462,105 A | * | 10/1995 | Supernak ................. 160/323.1 |
| 5,551,744 A | * | 9/1996 | Liao .......................... 296/97.4 |
| 6,047,762 A | * | 4/2000 | Anderson ............. 160/370.22 |
| 6,347,825 B2 | * | 2/2002 | Seel et al. ................. 296/97.8 |
| 6,488,069 B1 | * | 12/2002 | Mashaw et al. .............. 160/67 |
| 6,681,832 B1 | * | 1/2004 | Procida et al. ......... 160/370.22 |
| 6,910,518 B2 | * | 6/2005 | Zimmermann et al. 160/370.22 |
| 2005/0126724 A1 | * | 6/2005 | Ayran .................... 160/370.21 |
| 2005/0150617 A1 | * | 7/2005 | Beck et al. ............ 160/370.22 |

* cited by examiner

Primary Examiner—Blair M. Johnson
(74) Attorney, Agent, or Firm—Leydig, Voit & Mayer, Ltd.

(57) ABSTRACT

A window shade assembly for motor vehicles is provided. The window shade assembly includes a window shade element that is cut into a trapezoidal shape in order to be optimally adapted to the shape of the corresponding window. The winding shaft for this window shade web resembles a truncated cone that is approximated by means of a cylindrical core with wrappings applied thereon.

31 Claims, 5 Drawing Sheets

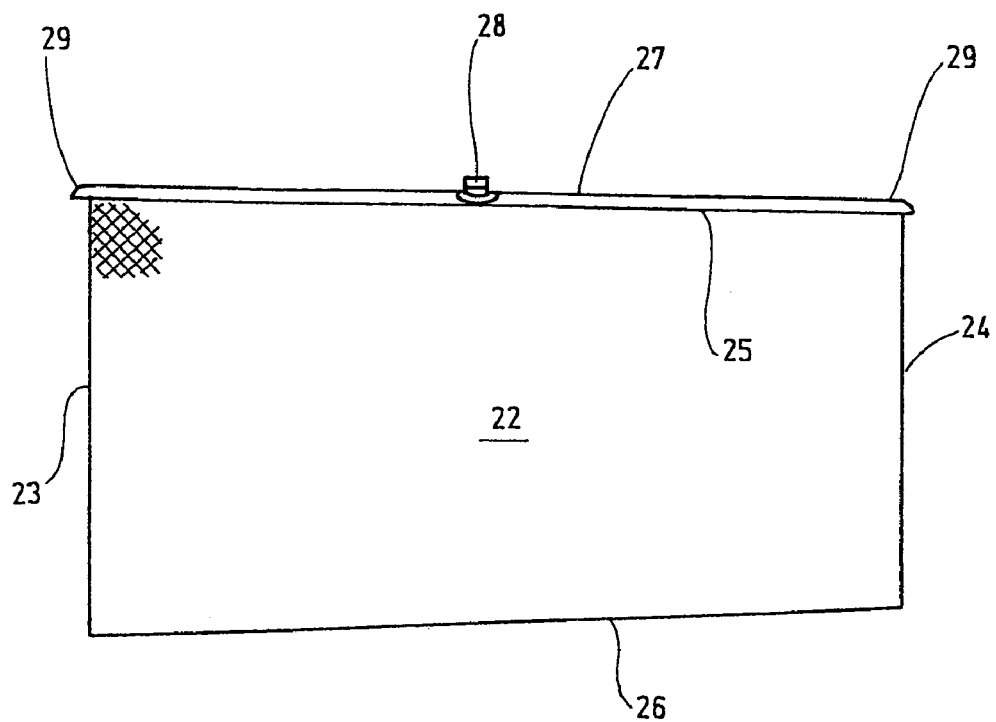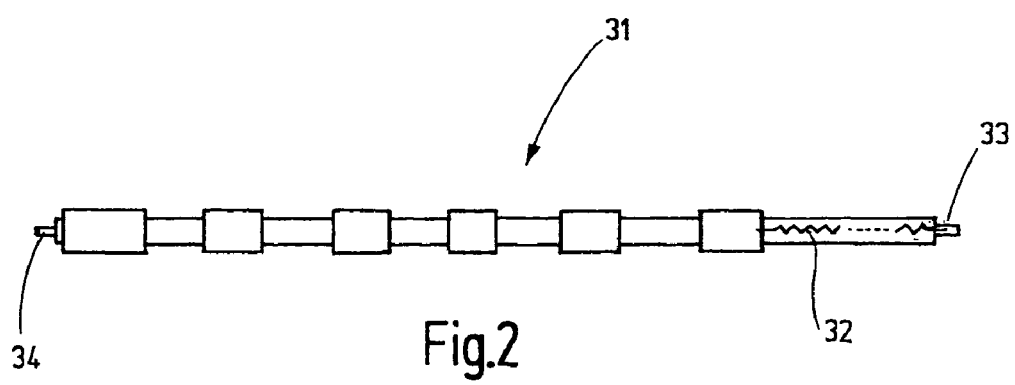
Fig.2

WINDOW SHADE WITH CONICAL WINDING SHAFT

BACKGROUND OF THE INVENTION

Motorcars are typically equipped with additional side windows in the rear area of the car body. These side windows are either directly integrated into the car body or form part of rear side doors. If such a window is arranged in a side door, it is typically divided into two sections, namely an approximately trapezoidal section and a triangular section. The trapezoidal section is designed in this fashion because the side window pane can be lowered in this region in order to open the window. The upper edge of the side window is almost always composed of an essentially straight section and a curved section in order to prevent an abrupt transition into the triangular region. The upper edge of the quadrangular section can be considered to be roughly straight. However, this section does not extend parallel to the lower edge due to the shape of the car body. When the side window pane is lowered, this results in the upper edge of the window pane still being visible in the front end of the window slot, while the rear section is significantly lowered below the window slot.

This is acceptable with window panes. However, if the side window is shaded by a window shade, one encounters the problem that the upper edge of the side window shade either projects beyond the lower edge of the window or causes a large gap to remain into which objects may fall. This is of particular importance because children are frequently seated on the rear seats of motorcars and thus the risk of objects being dropped into the interior of the door through the gap is accordingly high.

Consequently, it would be very desirable to provide a window shade assembly which ensures that the upper edge of the window shade web will completely close off the extraction slot in the rear portion of the side window shade. In theory, this can be accomplished by arranging the window shade shaft underneath the lower window edge such that it extends parallel to the upper edge of the window. Such an arrangement is usually not feasible, however, due to the space conditions in the interior of a car door. The design engineer is forced to accommodate the window shade shaft parallel to the lower edge. This arrangement results in a longer vertical dimension of the window shade web in the area that lies toward the front end of the vehicle than in the area that lies toward the rear of the vehicle. When the window shade web is wound up, this means that more material needs to be wound up in the front edge region of the window shade web than in the rear edge region.

In this context, EP 0 111 270 teaches simulating a conical winding shaft. The disclosed winding shaft actually has a strictly cylindrical shape and the desired conicality is achieved by providing the window shade web fixed on the winding shaft with a triangular extension. The triangular extension is configured integrally with the section that can be unwound from the winding shaft. The extension is limited by a dividing line that lies parallel to the winding shaft and delimits the extension from the section that can be unwound. The extension is also limited by two lateral edges that respectively originate at the dividing line such that a right triangle is formed, one leg of which consists of the dividing line.

However, this arrangement is limited to applications in which the short lateral edge that forms an extension of the front lateral edge of the window shade, web and thus the other leg of the triangle is shorter than the circumference of the winding shaft. Otherwise, the point would uncontrollably fold over during the wind up process at the assembly site. In addition, the strip shaped blanks are difficult to handle during assembly due to the limited reproducibility. One also has to take into account that the winding shaft ultimately moves along an arc of a circle when the triangular compensating section is wound up. In this case, the radius of the arc is defined by the length of the compensating section and the tip of this compensating section. The lack of rigidity in the material used for the window shade web additionally complicates the situation.

Another solution to this problem is disclosed in FR 2 750 158. In that reference, the conical shape of the winding shaft is achieved by wrapping up a triangular patch on a cylindrical core element. The patch is wound up with the long leg first. Although the reproducibility is somewhat improved with this arrangement, it is necessary to handle two separate blanks.

BRIEF SUMMARY OF THE INVENTION

In view of the foregoing, a general object of the invention is to develop a window shade for motor vehicles that can be handled more easily.

The various embodiments of the invention are all suitable for small-scale production, in which the tooling costs for the injection molding of conical winding shafts are unjustifiably high.

According to the invention, the core of the winding shaft consists of a cylindrical tube, preferably a steel tube. One or more wrappings consisting of bands are applied onto this steel tube. In one embodiment of the invention, several cylindrical wrappings are arranged adjacent to one another on the tubular core, the outside diameter of the wrappings respectively increasing from one end to the other end of the winding shaft, and accordingly decreasing in the other direction. The wrapping with the largest diameter is situated directly adjacent to one end.

Depending on the conicality and length of the winding shaft, the individual wrappings can have an axial length between 10% and 30% of the length of the winding shaft. The tip of the imaginary cone is directly formed by the core section that is free of wrappings. The steps created in this manner are so small that they cause no problems during the winding operation. It is also possible to space apart the wrappings in order to lower the material costs.

A similar embodiment involves applying cylindrical wrappings in layers. The first wrapping layer is situated directly on the winding shaft and has the largest dimension in the axial direction. The next wrapping layer is applied onto this continuous first wrapping layer and has a smaller dimension in the axial direction. The two wrapping layers end together at the same end of the winding shaft. Each additional wrapping layer that is applied onto the respectively preceding wrapping layers is slightly shorter, so that an appropriate number of wrapping layers ultimately lie on top of one another at one end of the winding shaft, and the number of wrapping layers is one smaller than the number of steps produced along the winding shaft. In this case, the smallest diameter of the resulting structure that resembles a truncated cone is also formed directly by the core.

A single continuous band can be used according to a third embodiment of the invention. The thread pitch of the wound up band is chosen such that the individual layers overlap one another. The larger and more defined the overlap, the larger the resulting diameter. In order to obtain a structure that resembles a truncated cone, the band is wound up with a variable pitch. The individual layers almost lie on top of one another congruently at the location where the desired cone should have its largest diameter. Conversely, the individual layers lie adjacent to one another on the end with the smallest diameter.

BRIEF DESCRIPTION OF THE SEVERAL VIEWS OF THE DRAWING(S)

FIG. 2 is a top view of the side window shade assembly according to FIG. 1.

DETAILED DESCRIPTION OF THE INVENTION

Figure 1:
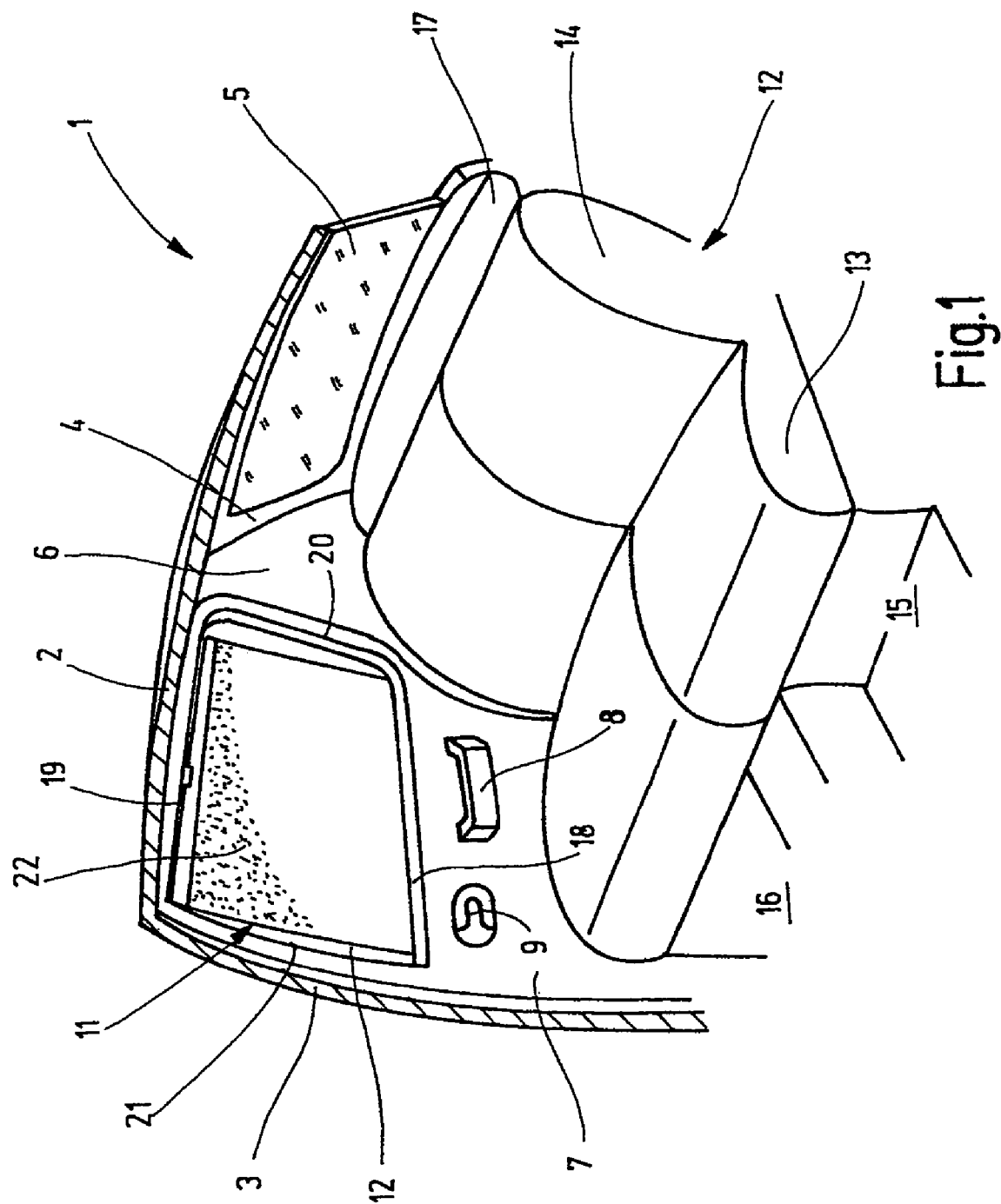
FIG. 1 is a partially cutaway perspective view of a rear section of a motor vehicle having an illustrative side window shade assembly according to the present invention viewed in the direction of the right rear side door.

A cut off rear section of a motor car is shown in FIG. 1. FIG. 1 provides a view of the right inner side that is the mirror image of the not shown left inner side. FIG. 1 is simplified in certain respects, e.g., interior structures of the car body such as reinforcements, mounting elements and the like are not shown because they are not essential for comprehending the invention. In other respects, the terms "right," "left," "front" and "rear" refer to the conventional terminology used in automotive engineering.

The illustrated car body section 1 includes a roof 2, from which a B column 3 laterally extends to a floor assembly. A corresponding B column is also provided on the left side of the vehicle (not shown). At its rear edge, the roof 2 transitions into a tailgate 4 that is conventionally hinged to the lower edge of the roof 2. A rear window 5 is accommodated in the tailgate 4. The tailgate 4 or the opening accommodating the tailgate borders on a C column 6. A right rear side door 7 is situated between the C column 6 and the B column 3. As mentioned above, another door that forms a mirror image of the right rear side door is arranged on the other side of the vehicle. The illustrated door 7 has a door handle 8 mounted on its inner side, as well as a lever 9 for opening the door.

The side window 11 is arranged in the upper region of the door 7. A window pane 12 situated in the side window can be conventionally raised and lowered, e.g., electrically, in order to open the window 11. A rear bench seat 12 with a divided seating surface 13 and a correspondingly divided rear setback 14 extends between the two rear side doors 7. Legroom areas 15 and 16 of the floor assembly are situated in front of the seating surface 13. The gap between the upper edge of the rear setback 14 and the inside contour of the tailgate 4 is closed off by a rear window shelf 17 that conventionally pivots upward when the tailgate 4 is opened. A trunk area is situated underneath the rear window shelf 17 and behind the rear setback 14.

The window 11 situated in the side door 7 is bounded by a lower straight edge 18, as well as a largely straight upper edge 19 and two lateral edges 20 and 21. The upper edge 19 extends at an acute angle to the lower edge 18 as shown, i.e., the distance between the upper edge and the lower edge 18 is greater in the vicinity of the front lateral edge 21 than in the vicinity of the rear lateral edge 20. As shown, the window shade element 22 can be positioned over the window 11 between these edges 18, 19, 20, 21. The window shade web 22 extends through a slot in the lower edge of the window frame. The window shade web 22 forms part of a side window shade assembly 23. The components of the side window shade assembly 23 that are essential for comprehending the invention are shown in FIG. 2. The illustrated side window shade assembly 23 is configured in the form of a manually actuated window shade.

The window shade element 22 is cut into a trapezoidal shape and bounded by a first lateral edge 23, a lateral edge 24 extending parallel thereto, an upper or terminal edge 25, and a base edge 26. The upper or terminal edge 25 is provided with a pull-out element 27 in order to reinforce this edge, said pull-out element consists of an approximately central hook 28 that can either be engaged with the upper edge of the window pane 12 of the window 11 or secured in a special eyelet on the inner side of the side door 7. The pull-out element 27 is straight and its course consequently corresponds approximately to that of the upper edge 19 of the side window 11 when the window shade element 22 is pulled out. This means that the window shade element 22 represents a trapezoidal approximation to the surface of the rear side window 11. The ends 29 of the pull-out element 27 project slightly beyond the lateral edges 23 and 24 so that in the wound up state of the shade it can be positioned on the edges of the slot, through which the window shade element 22 is extracted from the interior of the door 7.

In FIG. 2, a winding shaft 31 is illustrated underneath the window shade web 22. The window shade web 22 is fixed along its base edge 26 on this winding shaft, for example, by means of gluing. The winding shaft 31 contains a spring drive 32 that is situated in the tubular winding shaft 31 and fixed therein by one end. The other end of the spring drive 32, which consists, for example, of a helical spring, is non-rotatably anchored in a pin 33. In the installed state, this pin is non-rotatably held within the door, i.e., between the inside door lining and the outer skin of the door. The winding shaft 31 is rotatably supported on the pin 33. The winding shaft 31 includes a cylindrical pin 34 that is arranged coaxial to the pin 33, and this serves to rotatably support the winding shaft 31 at its other end.

Figure 3:
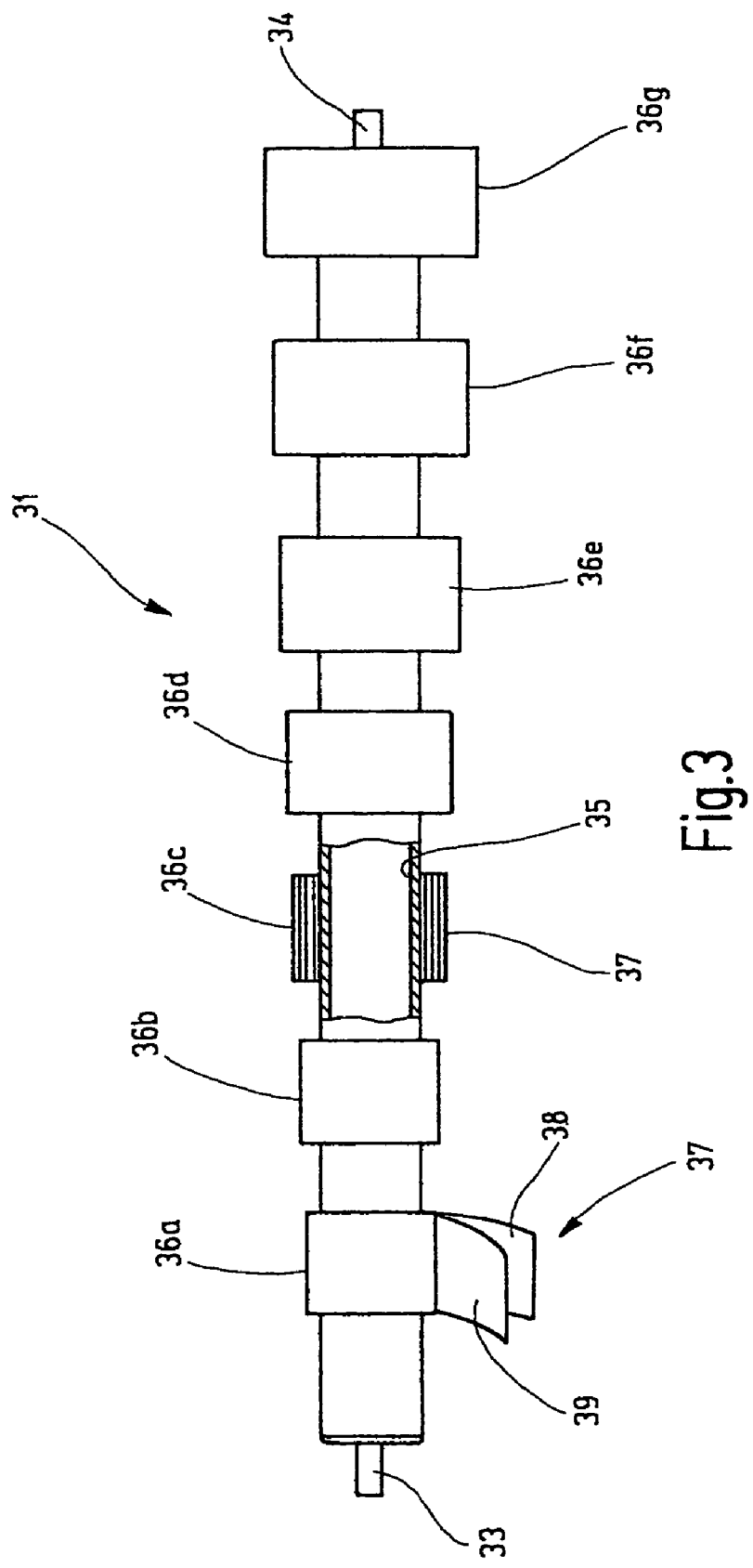
FIG. 3 is a side view of a first embodiment of the conical winding shaft of the side window shade assembly of FIG. 1 wherein wrappings used are arranged adjacent to one another.

The design of the winding shaft 31 is illustrated in an enlarged and highly schematic fashion in FIG. 3. The winding shaft 31 consists of a cylindrical tube 35, in which the spring drive 32 is accommodated. The axis of the straight winding shaft 31 should extend directly underneath and parallel to the essentially straight lower edge 18 for space reasons. The window shade web 22 is cut into the above described trapezoidal shape such that its upper edge 25 extends parallel to the upper window edge 19.

The winding shaft 31 needs to have a shape that at least approximately resembles a truncated cone in order to wind up this trapezoidal shade such that the pull-out element 27 also extends parallel to the window edge 18 at the end of the wind up process. The general rule is that the dimensions need be chosen such that the shorter edge 24 and the longer lateral edge 23 are wound up after the same number of shaft revolutions. The correlation is linear and inevitably results in the shape of a truncated cone. Several wrappings 36a . . . 36g are arranged adjacent to one another on the tubular core 35 in order to approximate this shape. As indicated by the sectioned area in the vicinity of the wrapping 36c, each wrapping 36a . . . 36g consists of several layers of a correspondingly wide band 37 that is wrapped on the shaft. Each wrapping 36 has an axial length that corresponds to the width of the band 37 used. The band 37 may consist, for example, of a fabric strip that is self adhesive on one side and, for example, is also referred to as handlebar type. The wrapping layers are applied until the desired diameter is reached at the respective location.

In order to reduce the material costs, the individual wrappings are spaced apart axially such that gaps are formed. These gaps are not detrimental because the required theoretical cone is in any case only approximated in sections by the individual wrappings 36. The band 37 consists of a textile or a foil like carrier strip 38 and an adhesive layer 39.

FIGS. 2 and 3 provide exaggerated representations of the structure of the winding shaft in order to elucidate certain aspects of the invention. In a practical embodiment, the diameter actually varies by no more than 6 mm over a length of approximately 50 cm between the end with the largest diameter and the end with the smallest diameter. This indicates that the required cone is exceptionally flat.

During production, the window shade element 22 is fixed only on the wrappings 36, but not in the intermediate spaces. Another option, not shown, consists of applying the individual wrappings 36 directly adjacent to one another.

Since the wrappings consist of a self adhesive tape, they are also fixed on the outer circumferential surface of the cylindrical tubular core 35 and are thus able to transmit the torque of the spring drive 32 to the window shade element 22. The wrapping direction of the individual wrappings 36 is identical, and is chosen such that tension exerted upon the window shade element 22 tends to tighten the mentioned wrapping 36. In other words, the wrapping direction of the wrappings 36 is identical to that of the window shade element 22 when it is wound up on the winding shaft 31.

Figure 4:
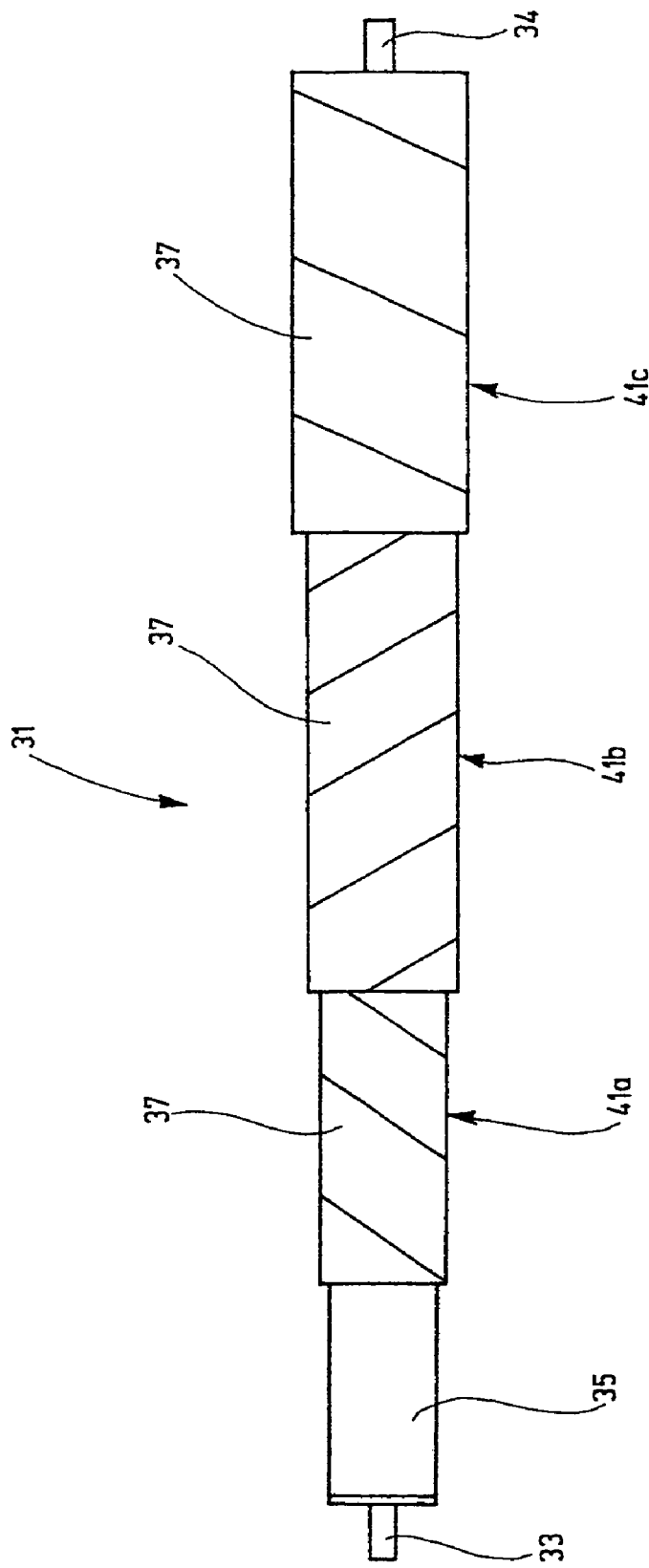
FIG. 4 is a side view of a second embodiment of the conical winding shaft of the side window shade assembly of FIG. 1 wherein the wrappings lie on top of one another.

In the embodiment of FIG. 3, the individual wrappings 36 lie adjacent to one another in the axial direction. However, it is also possible to arrange the wrappings on top of one another, as shown in FIG. 4. In the FIG. 4 embodiment, the winding shaft 31 also comprises a cylindrical tubular core 35 onto which a first wrapping 41a is applied. The wrapping 41a consists of a band 37 that is applied helically, in contrast to the spiral wrapping in the embodiment according to FIG. 3. The wrapping 41a extends from the end of the core 35 that is situated adjacent to the pin 34 to the vicinity of the end of the core 35 that is situated adjacent to the non rotatable pin 33. The wrapping 41a covers the core 35 over approximately 75% of its length. The individual wrapping layers of the band 37 adjoin one another, but do not overlap.

Another cylindrical wrapping 41b is applied on the outer circumferential surface of the wrapping 4a. This wrapping begins at the right end of the core 35, in the same location as the wrapping 41a, but has a shorter axial dimension and covers, for example, only 50% of the total length of the core 35. This wrapping also consists of a helically applied band 37. The different wrapping direction shown was chosen simply to better distinguish the wrappings. As will be appreciated, the wrapping direction of the wrapping 41b is identical to that of the wrapping 41a in practical embodiments.

In the embodiment of FIG. 4, the core 35 also carries a third wrapping 41c that begins at the right end of the core 35 and has an axial length that corresponds to approximately 25% of the length of the core 35. A truncated cone is once again approximated in sections with the aid of the three wrappings 41a . . . 41c and the section of the core 35 that is free of wrappings. The general rule regarding dimensions for approximating the shape of a truncated cone is identical to that described above with reference to FIG. 3. All of the wrappings 38 are configured identically.

Figure 5:
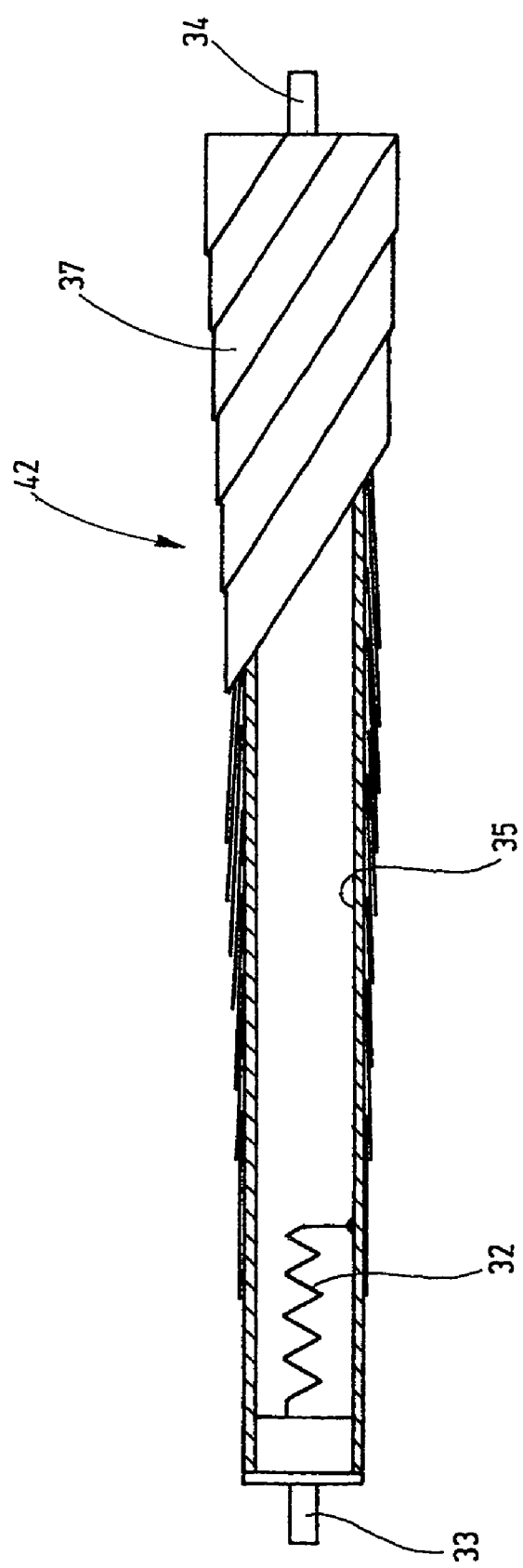
FIG. 5 is a side view of a third embodiment of a conical winding shaft of the side window shade assembly of FIG. 1 wherein a single wrapping with variable pitch is used.

A further embodiment in which the conical approximation is produced using a single wrapping 42 is shown in FIG. 5. As in the previously described embodiments, the wrapping 42 consists of a band 37 that is self adhesive on the side that faces the core 35. The wrapping 42 begins, for example, at a location that is distant from the left end by approximately 25% of the total length of the core 35. The band 37 is wrapped helically beginning at this location. The pitch in the embodiment of FIG. 4 is chosen in accordance with the width of the band 37, such that the individual wrappings lie exactly adjacent to one another in the axial direction. The pitch of the wrapping shown in FIG. 5 is chosen such that a wrapping layer of the band 37 overlaps the preceding wrapping layer by a certain distance. An increasingly larger wrapping diameter can be produced by varying the pitch.

For example, the individual wrappings lie strictly adjacent to one another in the first third of the wrapping 42 as described above. The pitch of the wrapping changes, for example, by one half at approximately the longitudinal center of the core 35, i.e., successive wrappings overlap one another by approximately 50% of the width of the band 37. Consequently, a double layer is produced in every region of the wrapping thus produced. Such a wrapping is produced over approximately ⅔ of the total length of the wrapping 39. The pitch is reduced, for example, to 25% of the width of the band 37 after the aforementioned ⅔ of the wrapping length. This arrangement results in a three layer wrapping, i.e., 3 layers of the band 37 respectively lie on top of one another beginning with this region. This ultimately results in a structure similar to that shown in FIG. 4.

The embodiment of FIG. 5 provides the significant advantages that only one band needs to be processed in a machine for wrapping the band 37 on the core 35 and it suffices to vary the pitch of the wrapping. In addition, the repeated attachment of a band 37 required in the embodiments of FIGS. 3 and 4 is eliminated.

In order to clearly explain the present invention, the FIG. 5 embodiment was described above in the form of an example with an abruptly changing pitch. However, those skilled in the art will appreciate that the pitch of the wrapping can also change continuously in order to realize a very precise cone adaptation.

If a significant conicality is required, the wrapping technique according to FIG. 5 may be combined with the wrapping technique according to FIG. 4. This results in a winding shaft on which each FIG. 4 wrapping 38 is no longer cylindrical, but already conical in itself.

A window shade assembly for motor vehicles is provided. The window shade assembly includes a window shade element that is cut into a trapezoidal shape in order to be optimally adapted to the shape of the corresponding window. The winding shaft for this window shade web resembles a truncated cone that is approximated by means of a cylindrical core with wrappings applied thereon.

The invention claimed is:

1. A window shade assembly for motor vehicles comprising:
   a winding shaft that includes a core with a cylindrical outer circumferential surface;
   a first wrapping that is non-rotatably applied onto the winding shaft, the first wrapping comprising a band that is spirally wrapped on the core of the winding shaft, the first wrapping being situated adjacent to a first end of the core;

a second wrapping that is applied onto the winding shaft, the second wrapping comprising a band that is spirally wrapped on the core of the winding shaft, the second wrapping having an outside diameter relatively smaller than an outside diameter of the first wrapping, the second wrapping being situated between the first wrapping and a second end of the core, such that a cone is approximated in sections by the first and second wrappings and a section of the core that is free of wrappings; and a window shade element having a non-rectangular shape, an edge of the window shade element being fixed on the outer circumferential surface of the first and second wrappings and the section of the core that is free of wrappings.

2. The window shade assembly according to claim 1 wherein a terminal edge of the window shade element has a pull-out element.

3. The window shade assembly according to claim 1 wherein the window shade element has at least one lateral edge that is substantially straight.

4. The window shade assembly according to claim 2 wherein the terminal edge of the window shade element is substantially straight.

5. The window shade assembly according to claim 1 wherein the window shade element comprises an essentially non-stretchable knitted fabric.

6. The window shade assembly according to claim 1 wherein a driving device is assigned to the winding shaft.

7. The window shade assembly according to claim 1 wherein the first and second wrappings are cylindrical.

8. The window shade assembly according to claim 1 wherein the first and second wrappings are spaced apart from one another in the axial direction.

9. The window shade assembly according to claim 1 wherein the bands comprising the first and second wrappings are between approximately 5 mm and approximately 50 mm wide and wherein each intermediate value of width forms a boundary of a new section of the approximation of the cone.

10. The window shade assembly according to claim 9 wherein the bands comprising the first and second wrappings are self adhesive bands that are equipped with an adhesive coating on one flat side.

11. The window shade assembly according to claim 9 wherein the bands comprising the first and second wrappings are formed by a carrier strip that has parallel edges.

12. A window shade assembly for motor vehicles comprising:

a winding shaft including a core with a cylindrical outer circumferential surface;

a first wrapping that is non-rotatably applied onto the winding shaft, the first wrapping comprising a band that is helically wrapped on the core of the winding shaft, the first wrapping beginning adjacent to a first end of the core and extending a certain distance in the direction of a second end of the core;

a second wrapping comprising a band that is helically wrapped on the first wrapping, the second wrapping having a length relatively shorter than a length of the first wrapping measured in the longitudinal direction of the winding shaft such that a cone is approximated in sections by the first and second wrappings and a section of the core that is free of wrappings; and a window shade element having a non rectangular shape, an edge of the window shade element being fixed on the outer circumferential surface of the first and second wrappings and the section of the core that is free of wrappings.

13. The window shade assembly according to claim 12 wherein a terminal edge of the window shade element has a pull-out element.

14. The window shade assembly according to claim 12 wherein the window shade element has at least one lateral edge that is substantially straight.

15. The window shade assembly according to claim 13 wherein the terminal edge of the window shade element is substantially straight.

16. The window shade assembly according to claim 12 wherein the window shade element comprises an essentially non-stretchable knitted fabric.

17. The window shade assembly according to claim 12 wherein a driving device is assigned to the winding shaft.

18. The window shade assembly according to claim 12 wherein the first and second wrappings are cylindrical.

19. The window shade assembly according to claim 12 wherein the bands comprising the first and second wrappings are between approximately 5 mm and approximately 50 mm wide and wherein each intermediate value of width forms a boundary of a new section of the approximation of the cone.

20. The window shade assembly according to claim 19 wherein the bands comprising the first and second wrappings are self adhesive bands that are equipped with an adhesive coating on one flat side.

21. The window shade assembly according to claim 19 wherein the bands comprising the first and second wrappings are formed by a carrier strip that has parallel edges.

22. A window shade assembly for motor vehicles comprising:

a winding shaft including a core with a cylindrical outer circumferential surface;

a wrapping that is non-rotatably applied onto the winding shaft, the wrapping comprising a band that is spirally wrapped on the core of the winding shaft, the wrapping having a pitch of the wrapping that is reduced in as the wrapping extends towards an end of the core such that a cone is approximated by the wrapping; and a window shade element having a non rectangular shape, an edge of the window shade element being fixed on the outer circumferential surface of the wrapping and the section of the core that is free of wrappings.

23. The window shade assembly according to claim 22 wherein the wrapping is conical.

24. The window shade assembly according to claim 22 wherein a terminal edge of the window shade element has a pull-out element.

25. The window shade assembly according to claim 22 wherein the window shade element has at least one lateral edge that is substantially straight.

26. The window shade assembly according to claim 24 wherein the terminal edge of the window shade element is substantially straight.

27. The window shade assembly according to claim 22 wherein the window shade element comprises an essentially non-stretchable knitted fabric.

28. The window shade assembly according to claim 22 wherein a driving device is assigned to the winding shaft.

29. The window shade assembly according to claim 22 wherein the bands comprising the first and second wrappings are between approximately 5 mm and approximately 50 mm wide and wherein each intermediate value of width forms a boundary of a new section of the approximation of the cone.

30. The window shade assembly according to claim 29 wherein the bands comprising the first and second wrappings are self adhesive bands that are equipped with an adhesive coating on one flat side.

31. The window shade assembly according to claim 29 wherein the bands comprising the first and second wrappings are formed by a carrier strip that has parallel edges.

* * * * *